United States Patent [19]

Theyanayagam

[11] Patent Number: 5,457,628
[45] Date of Patent: Oct. 10, 1995

[54] METHOD OF INTERPRETATION OF ELECTRICAL DISPERSION DATA OF POROUS MEDIA

[76] Inventor: Sabanayagam Theyanayagam, 16 Sygamore Rd., Bayonne, N.J. 07002

[21] Appl. No.: 221,513

[22] Filed: Apr. 1, 1994

[51] Int. Cl.[6] .................... G01V 3/24; G01V 3/38
[52] U.S. Cl. ........................ 364/422; 324/355
[58] Field of Search .................. 364/420, 422; 324/355, 354, 352, 324, 323, 372, 347, 351

[56] References Cited

U.S. PATENT DOCUMENTS

| | | | |
|---|---|---|---|
| 4,219,776 | 8/1980 | Arulanandan | 324/323 |
| 4,654,598 | 3/1987 | Arulanandan et al. | 324/347 |
| 4,755,944 | 7/1988 | Glass | 364/422 |
| 4,866,371 | 9/1989 | De | 324/347 |
| 5,144,245 | 9/1992 | Wisler | 364/422 |
| 5,187,661 | 2/1993 | Sinclair | 364/422 |

*Primary Examiner*—Donald E. McElheny, Jr.
*Attorney, Agent, or Firm*—M. K. Silverman

[57] ABSTRACT

A method of interpretation of electrical dispersion data relating to porous media such as soil, the media having a solid phase and a fluid phase, includes the steps of electromagnetically taking, as a function of megahertz frequency, a plurality of bulk material measurements of the parameters of conductivity and dielectric constant. The method further includes the step of inputting said conductivity and dielectric data into dispersion functions having, as their solvable variables, parameters including at least solid phase conductivity and dielectric constant, fluid phase conductivity and dielectric constant, and solid-fluid phase interface conductivity and dielectric constant. Information may also be obtained with respect to the parameters of particle shape, particle size, particle orientation, porosity, water content, and non-water content.

5 Claims, 15 Drawing Sheets

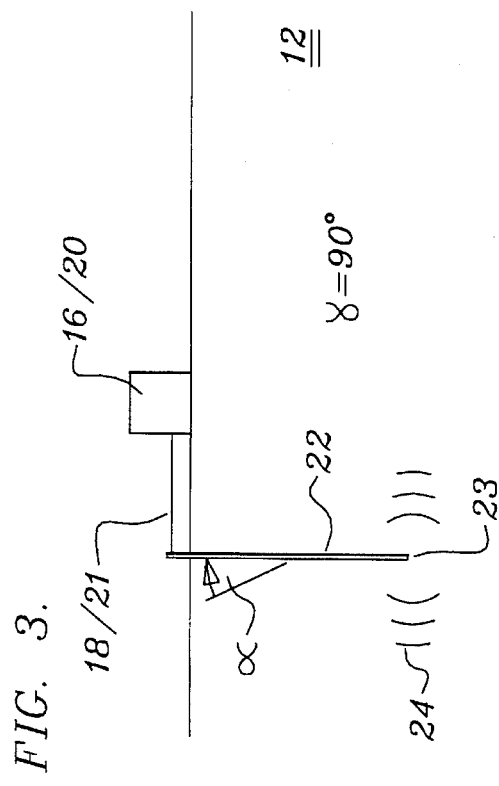
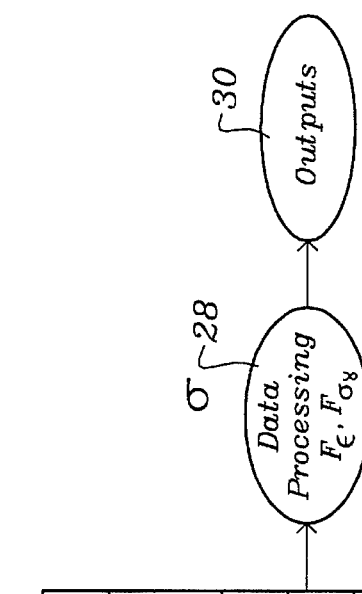
FIG. 3.
FIG. 4.

FIG. 11a.

| Soil | Pore-Fluid | Case Fig.10 | Pore Fluid Conductivity $\sigma_1$ (S/m) | | | Pore Fluid Dielectric $\epsilon_1$ | | | $\sigma_2$ (mho/m) | | Soil |
|---|---|---|---|---|---|---|---|---|---|---|---|
| | | | Predicted | Measured * | Measured ** | Predicted | Measured * | Measured ** | Predicted | Measured # | Measured ## |
| Montmorrilonite + Water | 100%Tap | I | 0.42 | 0.39 | 0.01 | 78 | 78 to 80 | 78 to 80 | 0.017 | n/a | 0 |
| | 100%Tap | I | 0.6 | --- | 0.013 | 78 | | | 0.025 | | |
| | 100%Tap | I | 0.78 | --- | 0.01 | 78 | | | 0.035 | | |
| Montmorrilonite + Water + Alcohol | 75T+25A | I | 0.4 | --- | 0.005 | 70 | --- | 60 | 0.016 | n/a | 0 |
| | 50T+50A | I | 0.16 | --- | 0.002 | 60 | --- | 57 | 0.006 | | |
| | 25T+75A | I | 0.20 | --- | 0.0015 | 45 | --- | 48 | 0.006 | | |
| | 100% Alc. | I | 0.04 | --- | 0.0004 | 30 | --- | 32 | 0.002 | | |
| Montmorrilonite + Water + Glycerol | 50T+50G | I | 0.2 | --- | | 60 | --- | --- | 0.008 | n/a | 0 |
| | 25T+75G | I | 0.085 | --- | | 57 | --- | --- | 0.004 | | |
| | 100% Gly. | I | 0.04 | | | 46 | --- | 50 | 0.0016 | | |
| Kaolin + Water + Alcohol | 100%Tap | III | 0.012 | 0.015 | 0.01 to 0.013 | 78 | 78-80 | 78-80 | 0.04 | n/a | 0 |
| | 100%Tap | | 0.01 | | | 78 | | | 0.03 | | |
| | 100% Alc. | | 0.0006 | | | 42 | | | 0.0015 | | |
| | 50T+50A | | 0.004 | | | 73 | | | 0.013 | | |

| Particle Conductivity $\epsilon_2$ | | R | | | $P_\theta$ | | Moisture (%) | Porosity | | $\beta_\sigma(=\sigma_2/\sigma_1)$ | $\beta_\epsilon(=\epsilon_2/\epsilon_1)$ | Figure |
|---|---|---|---|---|---|---|---|---|---|---|---|---|
| Predicted | Measured # | Measured ## | Predicted | Anticipated | Predicted | Anticipated | Measured | Predicted | Measured | Predicted | Predicted | |
| 40 | n/a | <10 | 300 | Large | 0.33 | Isotropic | 786 | 0.95 | 0.95 | 0.04 | 0.5 | 6a |
| 40 | | | | | | | 537 | 0.935 | 0.935 | 0.04 | 0.5 | 6b |
| 40 | | | | | | | 395 | 0.92 | 0.91 | 0.045 | 0.5 | 6c |
| 30 | n/a | <10 | 300 | Large | 0.33 | Isotropic | 362 | 0.90 | 0.91 | 0.04 | 0.4 | — |
| 24 | | | | | | | 335 | 0.90 | 0.91 | 0.04 | 0.4 | 7c |
| 18 | | | | | | | 107 | 0.77 | 0.77 | 0.03 | 0.4 | 7b |
| 12 | | | | | | | 96 | 0.75 | 0.76 | 0.05 | 0.4 | 7a |
| 17 | n/a | <10 | 300 | Large | 0.33 | Isotropic | 204 | 0.83 | 0.83 | 0.04 | 0.3 | 8c |
| 17 | | | | | | | 104 | 0.7 | 0.7 | 0.05 | 0.3 | 8b |
| 16 | | | | | | | 63 | 0.57 | 0.57 | 0.04 | 0.35 | 8a |
| 5 | 2 to 5 | <10 | 2 to 5 | Small | 0.33 | Isotropic | 106 | 0.75 | 0.74 | 3.3 | 0.06 | 9a |
| 2 | | | | | | | 96 | 0.73 | 0.73 | 3.0 | 0.03 | 9a |
| 5 | | | | | | | 81 | 0.71 | 0.71 | 2.5 | 0.12 | 9b |
| 5 | | | | | | | — | | | 3.25 | 0.07 | 9b |

FIG. 11b.

| | Pore Fluid | | | | | | | | | |
|---|---|---|---|---|---|---|---|---|---|---|
| Montmorillonite @@ | Water | I | 0.6 | n/a | n/a | 78 | 78 | -- | 0.03 | n/a | 0 |
| Artificial Soil @@ | Water | III | 0.03<br>0.262<br>1.25 | -- | 0.0001<br>0.262<br>1.25 | 78<br>78<br>78 | 78<br>78<br>78 | --<br>--<br>-- | 0.03<br>0.03<br>0.03 | 0.755<br>0.755<br>1.2 | 0.755 |
| Kaolin @@ | Water | III | 0.01 | | | 78 | 78 | | 0.0355 | | 0 |

Notes: * = Pore Fluid Extract;  = Original Fluid; # = "Wet soil particle"; ## = Parent soil mineral; @@ = see Thevanayagam (1993e) for details; * Anticipated value; n/a = not applicable; -- = data not available; 25T+75A = 25% tap water and 75% alcohol; 25T+75G = 25% tap water and 75% Glycerol.

FIG. 11c.

| | | | | | | | | | | |
|---|---|---|---|---|---|---|---|---|---|---|
| 40 | n/a | <10 | 300 | Large | 0.35 | | 455 | 0.923 | n/a | 0.05 | 0.5 | @@ |
| 40 | | | 300 | | 0.35 | | 361 | 0.90 | | | |
| 40 | | | 300 | | 0.4 | 1-Dimensional Consolidated | 260 | 0.871 | | | |
| 38 | 38 | | 1 | 1 | n/a | | -- | 0.37 | 0.37 | 25 | 0.5 | @@ |
| | | | | | | | | | | 3.75 | 0.5 |
| | | | | | | | | | | 1.0 | 0.5 |
| 2 | | <10 | 5 | Small | n/a | | 57 | 0.602 | -- | 3.5 | 0.025 | @@ |

FIG. 11d.

METHOD OF INTERPRETATION OF ELECTRICAL DISPERSION DATA OF POROUS MEDIA

APPLICATION FOR LETTERS PATENT

BE IT KNOWN THAT I, Sabanyagam Thevanayagam, a resident of the state of New Jersey and citizen of Sri Lanka, have invented a certain new and useful improvement in a Method of Interpretation of Electrical Dispersion Data of Porous Media, of which the following is a Specification:

BACKGROUND OF THE INVENTION

The concept of utilizing electromagnetic waves to study porous media, including geological materials, has existed for some time and, more particularly, dates back to Maxwell in (1881) "A Treatise on Electricity and Magnetism", 2nd Ed. Clarendon Press, Oxford, England, 398.

The use of electromagnetic waves in geo-applications is attractive for two reasons. Firstly, all factors that effect an electrical response of a soil due to excitation by an alternating (AC) voltage derive from electrical, chemical, and mechanical characteristics of the soil itself. Secondly, the application of AC voltage to soil and geological media does not alter the properties thereof. It is, therefore, possible to employ an electrical response that constitutes a reflection of the properties of the soil in its in situ state. As has been noted by Schwartz (1962) "A Theory of the Low-frequency Dielectric Dispersion of Colloidal Particles in Electrolyte Solution", J. Phys. Chem. 66, 2636–2642; and Mitchell and Arulanandan (1968) "Electrical Dispersion in Relation to Soil Structure", ASCE, J. Soil Mech. and Found. Div., 94(2), 447–470, due to the mechanical and chemical interactions within soils at the micro level, the macroscopic electrical response in terms of conductance and capacitance of the soil in bulk are frequency dependent. Since the same factors control macroscopic mechanical soil behavior, an electrical response is required to provide a response spectra of soil-signature information at a microscopic as well as at the macroscopic level. That is, such a dispersion of measured frequency-dependent electrical parameters reflect the microscopic physical and chemical soil interactions as well as macroscopic bulk soil behavior and, thereby, can provide a spectrum of soil-signature information.

The above is meaningful as a point of departure of research into frequency domain analysis of electrical dispersion characteristics of reflected microwaves in the context of numerous geological and geo-environmental issues of concern to civil, chemical, environmental, petroleum, and other engineers. More particularly, geo-technical and geo-environmental problems often appear in the context of so-called two-phase soil, that is, soil consisting of a solid particle portion and a fluid portion. It is to the analysis of such two-phase soil that the instant method of data interpretation is directed.

A two-phase soil model includes various soil types having concentrations of pore fluids and solids including therein water, air, solutes, oil, and various pollutants or contaminants, and having solid particles of various sizes, shapes, arrangements, and inter-particle bondings. Accordingly, the present area is to be understood as a method of electrical dispersion data interpretation by which parameters of soil particle shape, particle size, particle orientation, soil porosity, water content, non-water content, and contaminant concentration, liquid phase conductivity and dielectric constant, solid phase conductivity and dielectric constant, and liquid-solid phase interface may all be derived from such a frequency domain analysis of electrical dispersion of porous media.

The instant invention is, therefore, a recognition that, due to mechanical and chemical interactions of soil at the micro level, and the hetrogenity in the electrical parameters of the basic constituents of soil, the macroscopic electrical response in terms of conductance and permittivity (dielectric constant) of the bulk soil are frequency dependent. The instant invention may therefore be viewed as a means of quantifying of the effect upon measured electrical dispersion of bulk soil upon the specific parameters of particle shape, particle size, particle distribution, porosity, water content, other fluid content, type of soil, conductivity and dielectric and interface surface fluid-particle interface characteristics.

The invention is, accordingly, to be understood as a non-invasive, non-destructive in situ technology for providing reliable interpretation needed to quantitatively predict and evaluate basic factors that control soil behavior, define the presence and type of pore fluid including hydrocarbon and its contaminants, monitor contaminant transport, and monitor post clean-up ground water and soil conditions.

With respect to the applicable prior art, Schwartz (1962), cited above, investigated possible mechanisms causing anomalous dielectric dispersion in frequency ranges of under 100 KHz and concluded that basic soil-water interfacial electrical parameters are frequency-dependent and cause low frequency electrical dispersion. Mitchell and Arulanandan (1968), cited above, investigated variations in conductivity and dielectric constant over frequency ranges under 100 MHz for clays and concluded that the magnitude of the dispersion was related to soil type.

Sachs and Spiegler (1964) "Radiofrequency Measurements of Porous Conductive Plugs" Ion Exchange Resin-Solution Systems, Journal of Physical Chemistry, Vol. 68, p1214, investigated anomalous dispersion in the radio-frequency range (one to three hundred MHz) and developed an empirical equivalent three-element circuit model to match the observed dispersion, Arulanandan and Smith (1974) "Electrical Dispersion in Relation to Soil Structure", J. Geotech. Eng Div., ASCE, 99(12), 1113–1133 evaluated the applicability of this circuit model to soils and attempted to provide explanations for the circuit model of Sachs and Speigler. The empirical nature of this model provided varying degrees of success in matching observed dispersions. However, the empirical model parameters obtained, using curve fitting procedures, could not be linked to soil composition and other parameters on a reliable or fundamental basis. Further, the model of Sachs and Speigler was one dimensional and, as such, was useful only with measurements that could be taken from a single physical direction or plane.

Sen et al (1981) "A Self-similar Model for Sedimentary Rocks with Application to the Dielectric Constant of Fused Glass Beads" Geophysics, 46(5), 781–795, developed a semi-theoretical model to study dielectric response of water-saturated rocks. However, they concluded that their model could not fully simulate observed dispersions. Similar attempts were made by Kenyon (1984) "Texture effects of Megahertz Dielectric Properties 3153–3159, and Raytha and Sen (1986) "Dielectric Properties of Clay Suspension in MHz to GHz Range", J. Colloid and Interface Sc., 109(2), 301–309. They also concluded that their models could not simulate observed dispersion data of different salinities in the fluid phase.

The present inventor began his investigation of electrical characterization of soil properties in 1987 at Purdue University. The earliest publication in connection therewith of the inventor occurred in 1991. See "Level Ground Soil-Liquefaction Analysis Using In-Situ Properties: I", ASCE, J. Geotech Eng Div., 117(2), p.364–367. In 1993 (Apr. 6 to 8), the inventor presented a further development of his ideas concerning electrical response of two phase soil at the ENPC Conference, Paris, France. See "Soil Pore Fluid Characterization Using Electromagnetic Waves", p.285–292, ENPC Proceeding 1993. The subject matter of said ENPC presentation was also incorporated into lectures of the inventor of Jun. 6–9, 1993, at the University of Virginia, ASCE/ASME/SES meeting of 1993, and at the Jun. 11–12, 1993, NSF workshop on Geo-Physical Techniques For Site and Material Characterization in Atlanta, Ga. In Aug., 1993 the inventor's paper entitled "Electrical Response to Two-Phase Soil: Theory and Applications" was published by ASCE J. Geotech. Eng Div. 119 (8) p.1250–1275.

While the inventor's above set forth papers discuss the theoretical basis of the instant invention, the implementation, i.e., reduction to practice thereof is not addressed therein.

With respect to the hardware, that is, the electromagnetic probe utilized to practice the present invention, such structures appear in the prior art as are taught in U.S. Pat. No. 4,654,598 (1987) to Arulanandan, et al, entitled Dielectric Method and Apparatus for In Situ Prediction of Porosity and Surface Area; and U.S. Pat. No. 4,866,371 (1989) to De, entitled Sample Accommodator and Method for the Measurement of Dielectric Properties.

SUMMARY OF THE INVENTION

The present invention relates to a method of interpretation of electrical dispersion data relating to porous media such as soil, the media having a solid phase and a fluid phase. The method, more particularly, comprises the steps of electromagnetically taking, as a function of megahertz frequency, a plurality of bulk material measurements of the parameters of conductivity and dielectric constant. The method further includes the step of inputting said conductivity and dielectric data into a plurality of dispersion functions having, as their solvable variables, parameters including at least solid phase conductivity and dielectric constant, fluid phase conductivity and dielectric constant, and solid-fluid phase interface conductivity and dielectric constant. Therefrom information may also be obtained with respect to the parameters of particle shape, particle size, particle orientation, porosity, water content, and non-water content. The form of the dispersion functions from which these parameters may be derived are:

$$F_{\epsilon\gamma} = \frac{\epsilon_1 - \epsilon_2}{\epsilon_\gamma - \epsilon_2} \quad F_{\sigma\gamma} = \frac{\sigma_1 - \sigma_2}{\sigma_\gamma - \sigma_2}$$

in which $F_{\epsilon\gamma}$ is the dispersion function dielectric constant at the angle $\gamma$ of inclination of transmission of the various megahertz frequencies; $F_{\sigma\gamma}$ is the dispersion function of conductivity at the angle $\gamma$ of inclination.

Subscript 1 relates to the dielectric constant and conductivity of the fluid phase of the bulk soil;

Subscript 2 relates to the dielectric and conductivity of the solid phase of the bulk soil; and Subscripts $\gamma$ relates to the dielectric constant and conductivity of the bulk soil at the angle of inclination of the direction of propagation of the electromagnetic wave, emanating from the radiating probe.

It is accordingly an object of the present invention to provide a generalized soil model for soil parameter characterization using electrical frequency response analysis of fluid containing soil.

It is another object to provide a soil model of the above type capable of taking into account particle shape, particle size particle orientation, porosity, conductivity, and dielectric constant of the respective solid and fluid phases of a measured soil system.

It is a further object of the invention to provide a frequency domain analysis of megahertz frequency electrical dispersion of two-phase soil.

It is a yet further object to provide a soil related megahertz electrical dispersion that yields a soil-signature capable of providing an infinite number of information sequences from which can be derived basic parameters of the measured soil system.

It is a still further object of the invention to provide a non-destructive and non-invasive in situ technology for the prediction and evaluation of basic factors of soil systems including the evaluation of types of pore fluids or contaminants, monitoring of contaminant transport, and monitoring of post cleanup water and soil conditions.

It is another object to provide a frequency domain analysis of electrical dispersion properties of porous media, having geo-technical, petroleum and other engineering geo-environmental applications.

The above and yet other objects and advantages of the present invention will become apparent from the hereinafter set forth Brief Description of the Drawings, Detailed Description of the Invention and Claims appended herewith.

BRIEF DESCRIPTION OF THE DRAWINGS

FIG. 3 is a representational view showing the taking of soil sample measurements in a field location.

FIG. 4 is a flow chart showing the inputting of soil dielectric constant and conductivity measurements as a function of frequency, and processing of such inputs to obtain desired outputs.

FIGS. 11, 11(a), 11(b), 11(c) and 11(d) are a table comparing predicted and measured basic soil parameters.

DETAILED DESCRIPTION OF THE INVENTION

Figure 1:
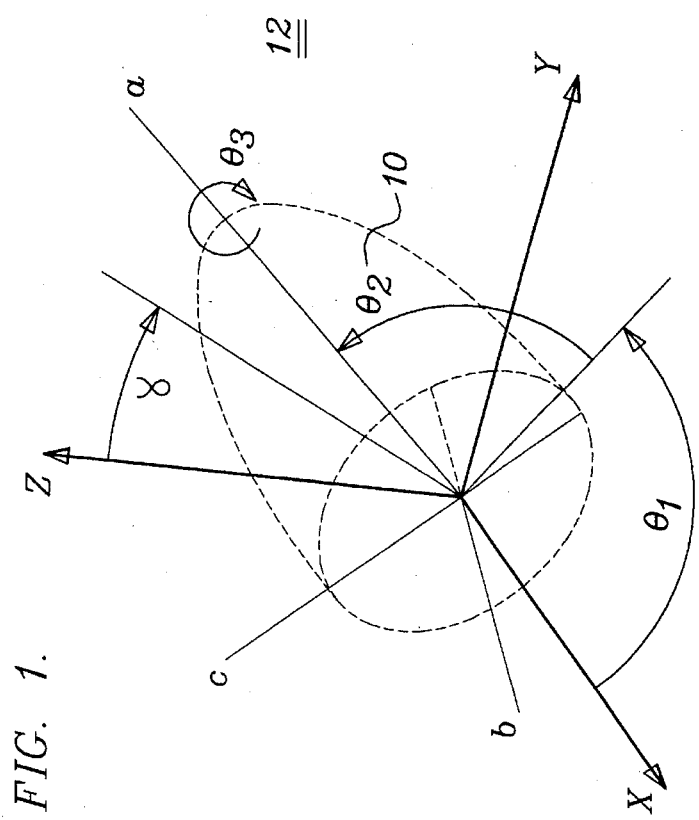
FIG. 1 is a diagrammatic view of a representative particle, showing particle shape orientation in a representative bulk soil sample.

With reference to FIG. 1 there is shown a representation of one-half of an ellipsoidal particle 10 existing within a bulk soil sample 12. An xyz Cartesian co-ordinate system is employed as a frame of reference. Therein, the z-axis represents the vertical axis, that is, the axis of the gravity vector. A second Cartesian co-ordinate system consists of a,b,c axes which, more particularly, define semi-axes of the half ellipsoid of the particle 10. The angle $\gamma$ which is shown relative to the z-axis represents the direction or axis of the electromagnetic probe taking the below-described measurements relative to the z or vertical axis of the soil sample.

The various angles $\Theta_1$, $\Theta_2$, $\Theta_3$ simply indicate relationships between the above-described x,y,z and a,b,c coordinate systems.

Figure 2:
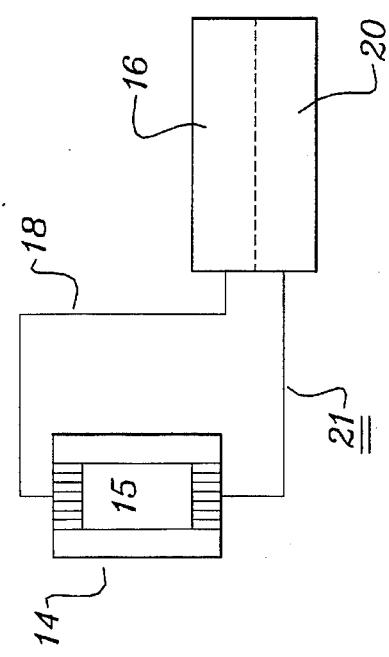
FIG. 2 is a representational view showing the testing of a soil sample in a laboratory.

With reference to FIG. 2 there is shown a container (typically made of teflon) 14 in which a soil sample 15 is placed. The nature of container 14 is similar to that of a large leaky capacitor and/or resistor to thereby permit the taking of dielectric constant and conductivity measurements.

The necessary frequency spectrum, that is, the spectrum from one to 100 megahertz is provided by a signal generator 16 which provides an input 18 to said container 14. Included within signal generator 16 is an impedance analyzer 20 which is necessary to measure the resistive/capacitive characteristics that are received from container 14 thru output 21.

It is to be appreciated that the system of FIG. 2 is one that is adapted for laboratory use only and which, in the context of the present invention, is of primary value in comparing predicted values according to the inventive method, with actual values, of electrical parameters of the soil sample.

With reference to FIG. 3 there is provided a representational view of the signal generator and impedance analyzer 16/20 positioned at an angle $\gamma$ relative to the vertical, wherein the value of $\gamma$ is zero. In the illustration of FIG. 3 there is shown probe 22 which, from electrode 23, generates a wavefront 24 from which are obtained a plurality of measurements of the conductivity and dielectric constant of the bulk soil 12. The probe 22 may be one of the types taught in U.S. Pat. Nos. 4,654,598 to Arulanandan et al or No. 4,866,371 to De, referenced in the Background of the Invention, or may have elongated configuration.

Therefrom are taken a plurality of readings across the entire range of one to one hundred megahertz (MHz) which are shown as inputs 26 in FIG. 4. Therein, as may be noted, measurements at each frequency $f_N$ are taken for the bulk soil dielectric constant $\epsilon$ and bulk soil conductivity $\sigma$ for the particular angle $\gamma$ of the probe 22.

In a processing step 28 (see FIG. 4), said dielectric and conductivity measurements are employed in so-called dispersion functions F which equations are of the following forms:

$$F_{\epsilon\gamma} = \frac{\epsilon_1 - \epsilon_2}{\epsilon_\gamma - \epsilon_2} \qquad F_{\sigma\gamma} = \frac{\sigma_1 - \sigma_2}{\sigma_\gamma - \sigma_2} \qquad (1), (2)$$

It has been discovered that if these measurements are taken over a plurality of said 1 to 100 MHz frequencies, a large number, e.g., in the range of ten to one hundred, equations may be generated that are of the form of said dispersion functions F for dielectric constant and conductivity. Thereby, it is possible to at least solve as outputs 30 for the dielectric value $\epsilon_1$ of the fluid portion, the dielectric constant $\epsilon_2$ of the solid portion of soil sample, the conductivity $\sigma_1$, of the fluid portion and the conductivity $\sigma_2$ of the solid portion of the soil.

Stated otherwise, each of the dispersion functions F, if viewed at only a single frequency, would not be solvable, except for certain special cases to be described later, because to solve an equation with four unknowns requires at least four equations. Accordingly, a discovery of the instant invention is that thru obtaining a plurality of frequency-dependent megahertz measurements of the bulk soil dielectric and conductivity, one can generate a group of equations with different values of $\epsilon$ and $\sigma$ that will provide enough information to permit the solution of the dispersion function equation F for not only said parameters but, as well, for various other soil-related parameters such as particle shape, particle size, particle orientation, soil porosity, water fluid content, non-water fluid content and solid-fluid interface dielectric and conductivity. Stated otherwise, it has been discovered that the parameters of soil solid phase dielectric, soil solid phase conductivity, soil fluid phase dielectric, soil fluid phase conductivity, particle shape, particle size, particle orientation, soil porosity, soil water content, soil non-water fluid content and solid-fluid phase interface properties each produce particular signatures over the frequency range of 1 to 100 MHz and that these signatures are definable in mathematical terms by equations that are direct or indirect functions, over a range of megahertz frequencies, of bulk soil dielectric at a given measurement angle and bulk soil conductivity at the same given measurement angle. These relationships and equations have, more particularly, been established, through my research, and are as follows:

$$F_{\epsilon\gamma} = \frac{\epsilon_1 - \epsilon_2}{\epsilon_\gamma - \epsilon_2} = \left( \frac{Z_\gamma^2 + (\omega\epsilon_{air})^2}{\frac{1-\beta_\sigma}{1-\beta_\epsilon} \frac{\sigma_1}{\epsilon_1} Z_\gamma + (\omega\epsilon_{air})^2} \right) X_\gamma \qquad (1a)$$

$$F_{\sigma\gamma} = \frac{\sigma_1 - \sigma_2}{\sigma_\gamma - \sigma_2} = \frac{1-\beta_\sigma}{1-\beta_\epsilon} \frac{\sigma_1}{\epsilon_1} \frac{1}{Z_\gamma} F_{\epsilon\gamma} \qquad (2a)$$

$$Z_\gamma = \left( \frac{(1-\beta_\sigma) + (\omega\epsilon_{air})^2 (1-\beta_\epsilon) \frac{\epsilon_1}{\sigma_1} \frac{Y_\gamma}{X_\gamma}}{(1-\beta_\epsilon) \frac{\epsilon_1}{\sigma_1} - (1-\beta_\sigma) \frac{Y_\gamma}{X_\gamma}} \right) \qquad (3)$$

-continued $$X_\gamma = 1 + \frac{1-n}{n} \left( Q\, Re\, f_a + \frac{1-Q}{2} Re\, (f_b + f_c) \right) \quad (4)$$

$$Y_\gamma = \frac{1}{\omega \epsilon_{air}} \frac{1-n}{n} \left( Q\, Im\, f_a + \frac{1-Q}{2} Im\, (f_b + f_c) \right) \quad (5)$$

$$Re\, f_\alpha = \left( \frac{B_{\sigma\alpha} + (\omega\epsilon_a)^2 B_{\epsilon\alpha} \left(\frac{\epsilon_1}{\sigma_1}\right)^2}{B_{\sigma\alpha}^2 + (\omega\epsilon_a)^2 B_{\epsilon\alpha}^2 \left(\frac{\epsilon_1}{\sigma_1}\right)^2} \right) ; \alpha = a,b,c \quad (6)$$

$$\frac{Im\, f_\alpha}{\omega\epsilon_{air}} = \left( \frac{(\beta_\sigma - \beta_\epsilon) A_\alpha}{B_{\sigma\alpha}^2 + (\omega\epsilon_{air})^2 B_{\epsilon\alpha}^2 \left(\frac{\epsilon_1}{\sigma_1}\right)^2} \right) \frac{\epsilon_1}{\sigma_1} ; \quad (7)$$

$$\alpha = a,b,c;\ \beta_\sigma = \frac{\sigma_2}{\sigma_1} ;\ \beta_\epsilon = \frac{\epsilon_2}{\epsilon_1} ;\ \delta_1 = \frac{\epsilon_1}{\sigma_1}$$

$$B_{\sigma\alpha} = 1 - (1 - \beta_\sigma) A_\alpha;\ B_{\epsilon\alpha} = 1 - (1 - \beta_\epsilon) A_\alpha \quad (8)$$

Although the observed experimental conductivity and dielectric constant are seemingly unrelated to each other, these equations indicate that they are governed by a simple relationship:

$$\frac{\sigma_\gamma - \sigma_2}{\epsilon_\gamma - \epsilon_2} = Z_\gamma \quad (9)$$

The following notations appear in the above equations:

$A\alpha$=shape factor.

$a,b,c$=semiaxis of ellipsoids.

$F$=dispersion function.

$f$=form factor.

$k$=complex conductivity.

$n$=porosity.

$P$=particle orientation factor.

$p$=probability density functions.

$Q$=directional function.

$R$=Aspect ratio (b/a)

$\epsilon$=dielectric constant.

$\sigma$=conductivity.

$P$=resistivity.

$\omega$=frequency of applied electric field.

$\delta$=angle of inclination with axis of symmetry $\beta\epsilon$, $\beta\sigma$=ratio of $\epsilon_2/\epsilon_1$ and $\sigma_2/\sigma_1$, respectively.

Subscripts:
1=of pore fluid phase.
2=of solid phase.
$\epsilon$=in terms of dielectric constant.
$\sigma$=in terms of conductivity.
$\delta$=measurement at angle $\delta$ with axis of gravity vector.

It has also been discovered if the dielectric and conductivity measurements are made at a single frequency close to 100 MHz the equations may be still solved in numerical form, to provide data of porosity or water content of the soil. In such an instance, it was found that the measurement must be made at 55° degrees relative to the axis of symmetry. The corresponding relationship between $\epsilon\gamma$ a $\gamma$=55 degree and the porosity or water content of the soil is graphically shown in FIG. 12.

Figure 13:
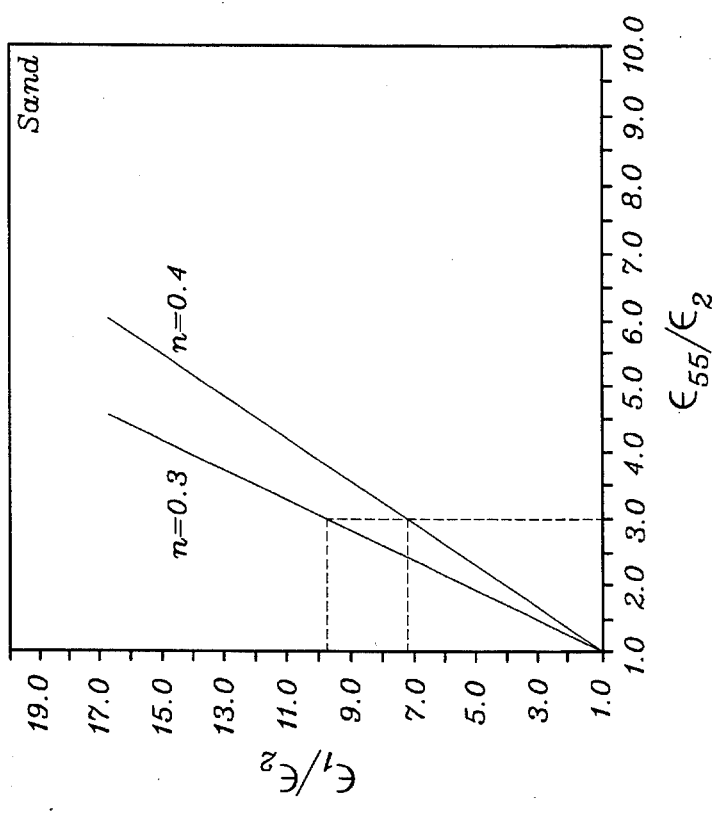
FIG. 13 is a chart of the relationship between dielectric constant, $\epsilon_{55}$, of the bulk soil at $\gamma=55$ degrees at high frequency close to 100 MHz and the fluid-phase dielectric constant, $\epsilon_1$, for said type soils.

It has also been discovered that it is possible to predict a range of fluid phase dielectric constant, $\epsilon_1$, values using the above $\epsilon\gamma$ value at $\gamma$=55 degrees in said type soils. The relationship between the range and $\epsilon\gamma$ at $\gamma$=55 degrees is graphically shown in FIG. 13.

It has also been discovered that the dispersion functions $F\epsilon$ and $F\gamma$ are tensors. Therefore, in the event that a single measurement cannot be made at $\gamma$=55 degrees, then it would be necessary to make two measurements at two inclinations $\gamma_1$ and $\gamma_2$. Due to the fact that the dispersion functions are tensors, the measured values of $\epsilon\gamma$ and $\sigma\gamma$ at inclinations $\gamma_1$, and $\gamma_2$ can be converted to an equivalent $\epsilon\gamma$ and $\sigma\gamma$ at $\gamma$=55 degrees using well known principles of tensors in the mathematical science.

Figure 12:
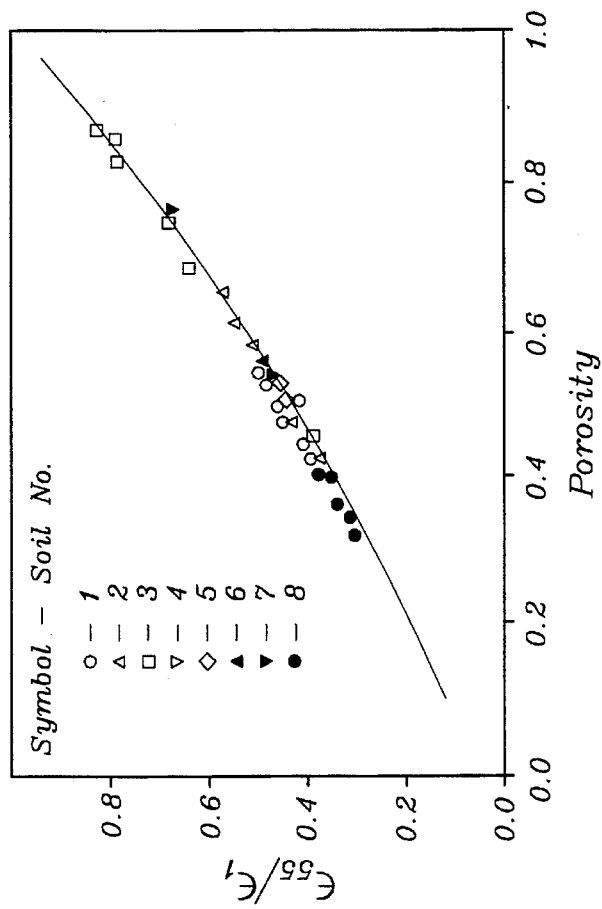
FIG. 12 is a chart of the relationship between dielectric constant of the bulk soil at an inclination $\gamma=55$ degrees at high frequency of the A.C. voltage near 100 MHz and the porosity of the soil.

Stated otherwise, it is not necessary to always measure the $\epsilon\gamma$ at $\gamma$=55 degrees. Instead two measurements could be made at two different inclinations $\gamma=\gamma_1$, and $\gamma=\gamma_2$ and still one could obtain an equivalent $\epsilon\gamma$ at $\gamma$=55 degrees and still predict porosity as shown in FIG. 12 or predict a range of fluid phase dielectric constant values $\epsilon_1$, using FIG. 13.

Figure 5B:
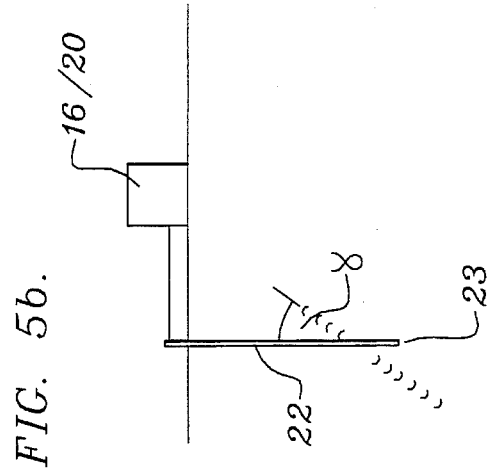
FIG. 5(b) is a view, similar to that of FIG. 3, however at an optimized $\gamma$ azimuth angle.
Figure 5A:
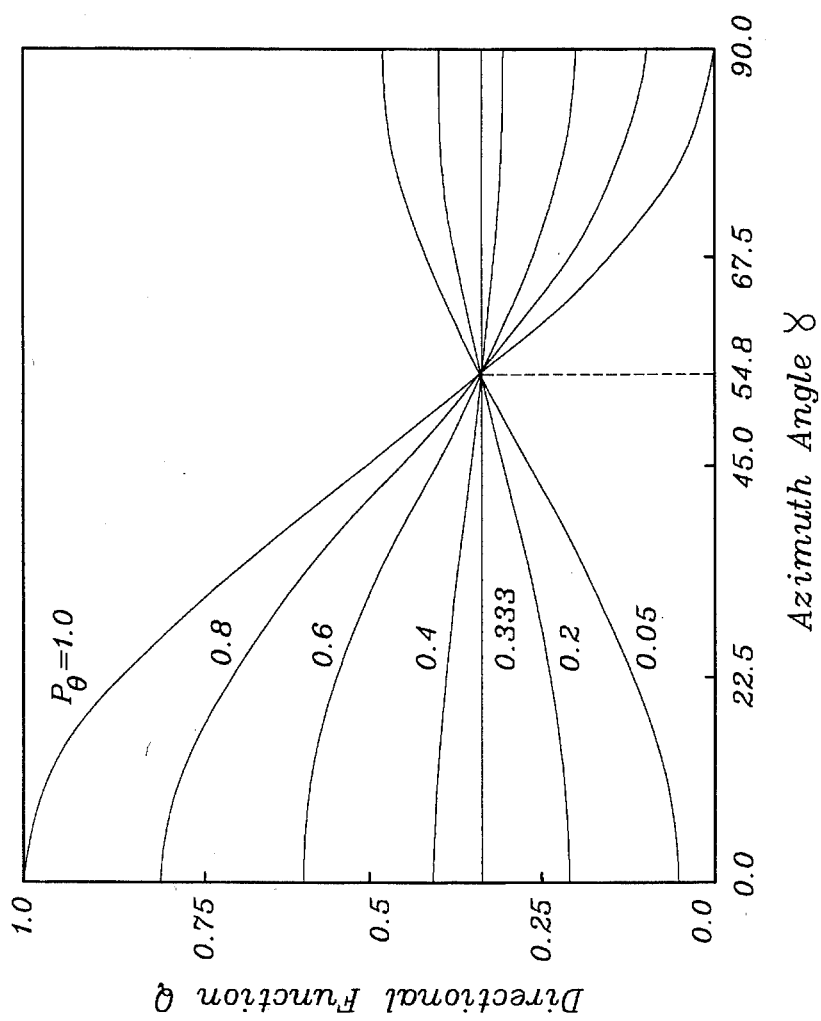
FIG. 5(a) is a chart showing the directional function Q relative to changes in azimuth angle $\gamma$ at varying particle orientation factors.

The graph or FIG. 5(a) demonstrates the manner in which the directionality function Q (See equations (4) and (5) above) varies as a function of the particle orientation factor P, Therefrom, it has been determined that the orientation of the particular particles within a bulk soil sample play essentially no role in the outputs 30 derived through the use of the above equations if the direction of electromagnetic wave propagation through soil near the probe 22 is at an azimuth angle $\gamma$ of fifty-five (55) degrees relative to the z or vertical axis. This, accordingly, represents a further discovery associated with my instant invention. Such a positioning of probe 22 is shown in FIG. 5(b).

Figure 6A:
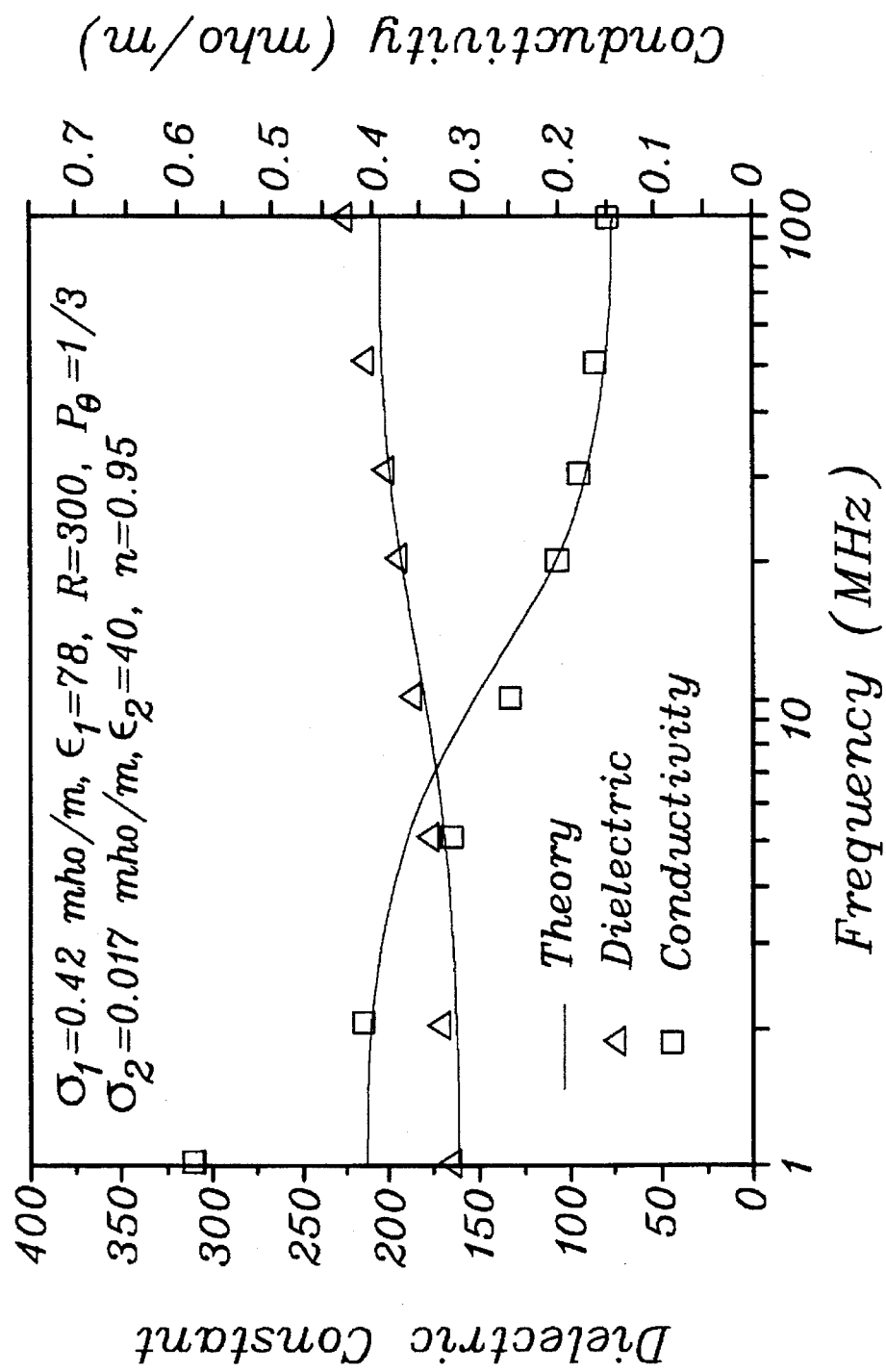
FIGS. 6 (a), (b), and (c) are a sequence of charts showing dielectric constant and conductivity as a function of frequency of a bulk soil sample with varying water contents for a montmorrilonite type soil.
Figure 6B:
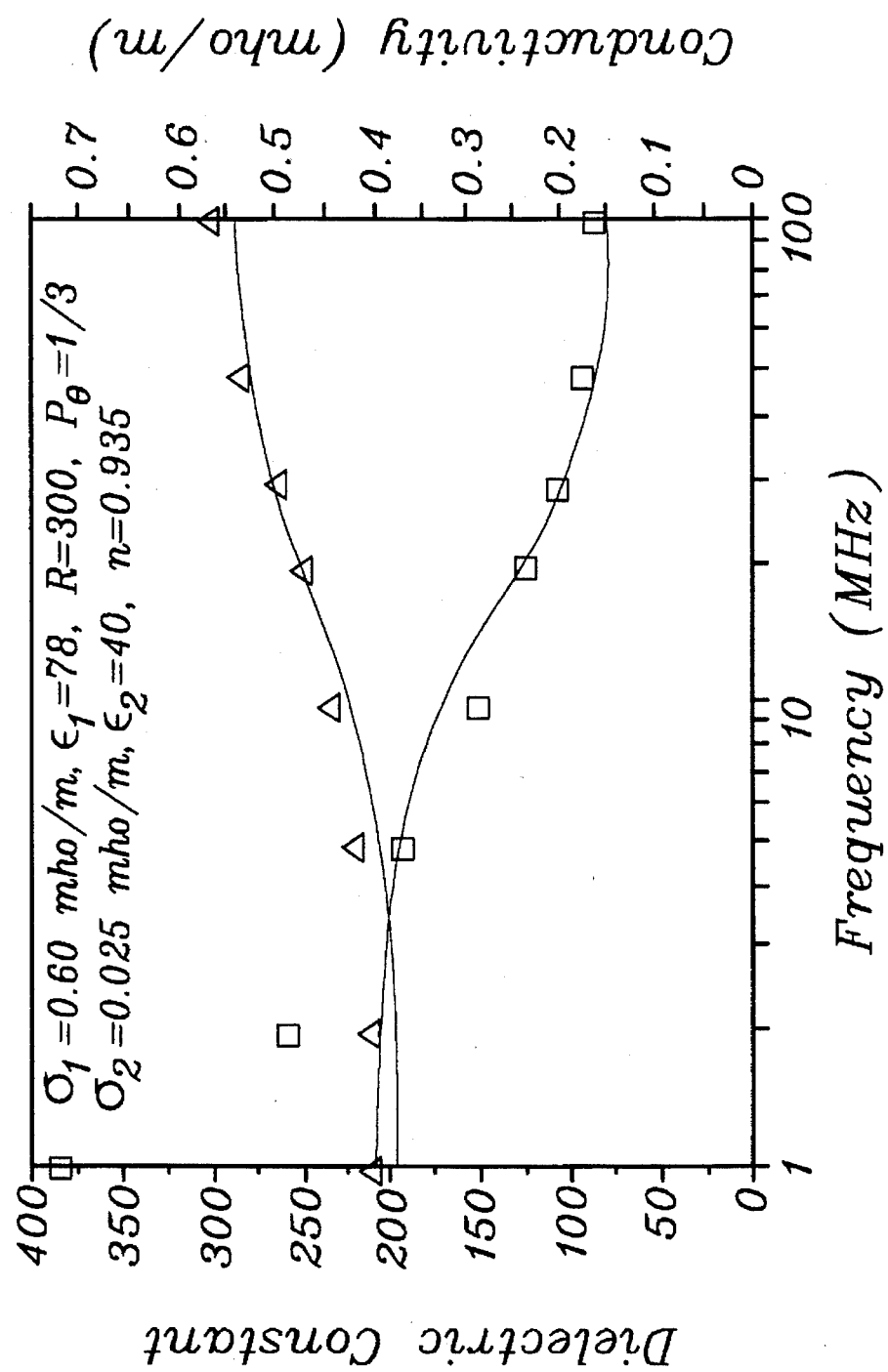
Figure 6C:
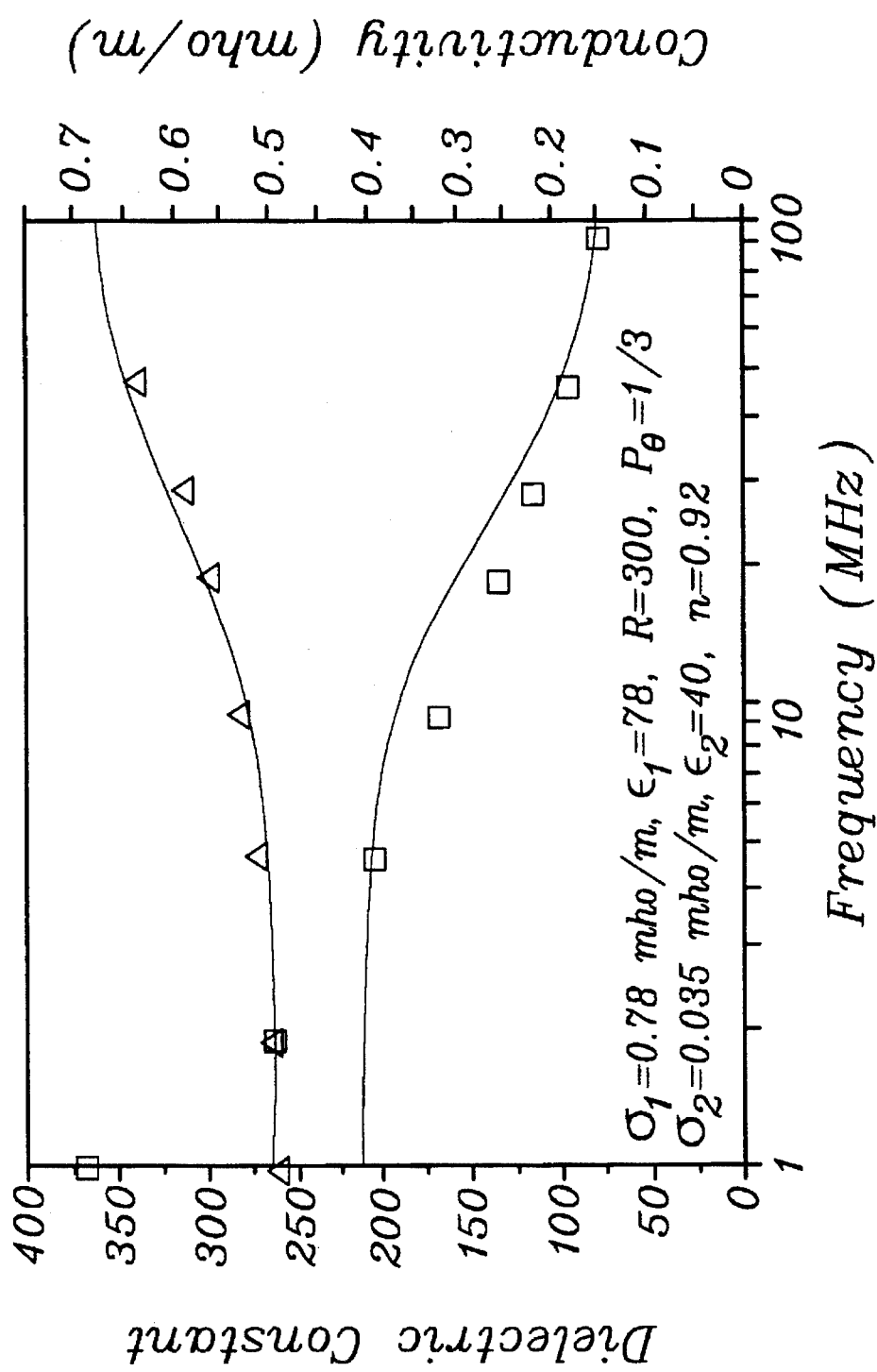

With reference to FIG. 6 there are shown various measurements of dielectric and conductivity for a montmorrilonite type soil have varying water contents of 786% for FIG. 6(a), 537% for FIG. 6b and 395% FIG. 6(c). Further shown on each figure is the derived values for $\sigma_1$, $\sigma_2$, $\epsilon_1$ and $\epsilon_2$ utilizing the above equations. Also shown is the value R which is the ratio of the minor-to-major axes ratio of the ellipsoid shown in FIG. 1. Further derived is the particle orientation factor P and the porosity n. As noted, the values for dielectric constant conductivity (the vertical of each graph) are plotted as a function of increasing frequency from left-to-right across the horizontal axis. Therein, while measurements were actually taken at only seven frequencies, through the use of curve fitting, as is shown, an infinite number of virtual points can be derived, thereby generating as many frequency dependent equations as may be required in a given application.

Figures 7A, 7B, 7C:
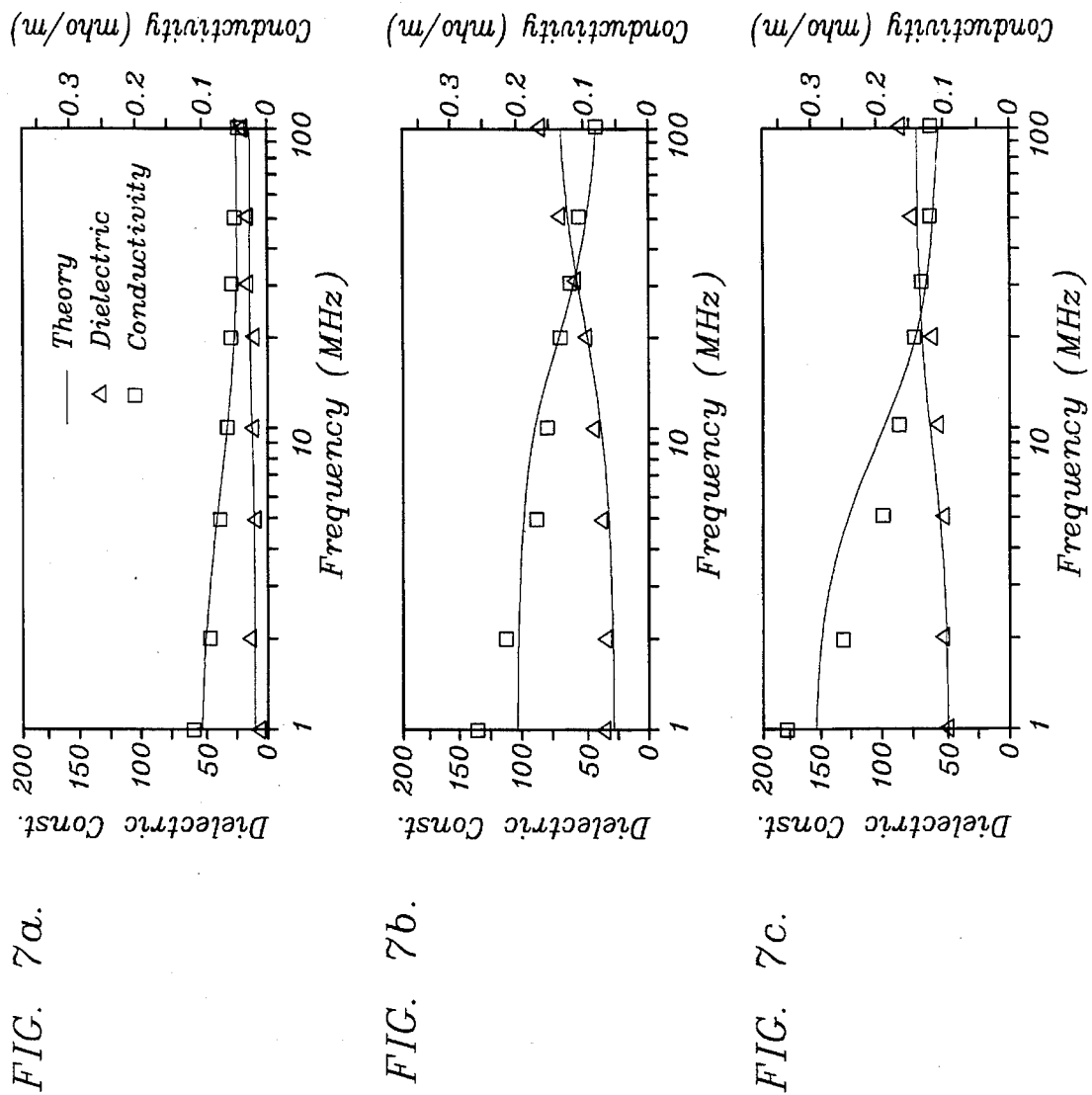
FIGS. 7 (a), (b), and (c) are a sequence of charts showing dielectric constant and conductivity as a function of frequency for montmorrilonite soil having varying percentages of alcohol therein.

With reference to FIG. 7, similar measurements are shown with respect to a montmorrilonite type soil having therein varying percentages of alcohol, that is, 100% alcohol in the case of FIG. 7(a), 75% in the case of FIG. 7(b), and 50% in the case of FIG. 7(c). As may be noted, the derived curves change as a function of the alcohol percent of the fluid phase of the bulk soil.

Figure 8A:
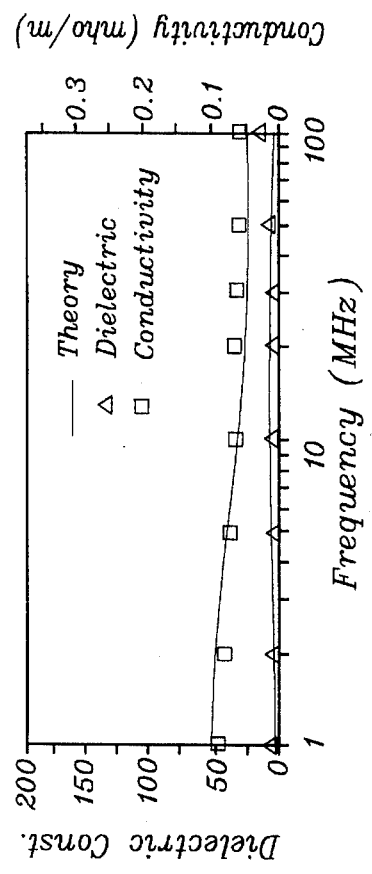
FIG. 8 (a), (b) and (c) are a sequence of charts showing dielectric constant and conductivity as a function of frequency for montmorrilonite type soil having different percentages of glycerol in the fluid content thereof.
Figure 8B:
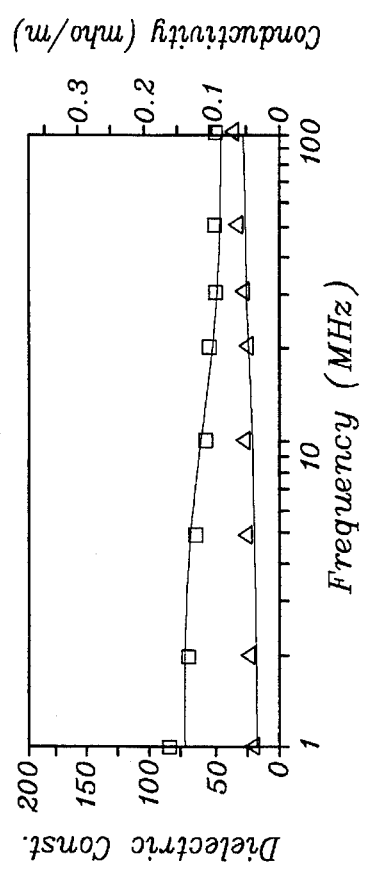
Figure 8C:
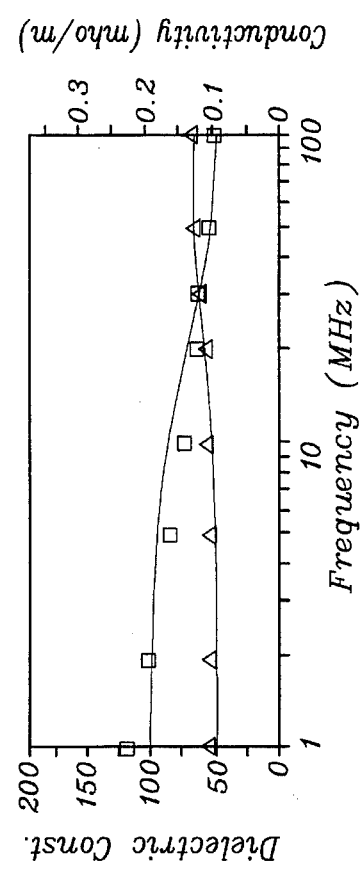

FIG. 8 is a group of graphs showing the electrical dispersion function in montmorrilonite soil in which the fluid phase thereof is 100% glycerol in the case of FIG. 8(a), 75% in the case of FIG. 8(b) and 80% in the case of FIG. 8(c). The difference in electrical dispersion both between such concentration of glycerol, and relative to FIGS. 6 and 7, is apparent.

Figures 9A, 9B:
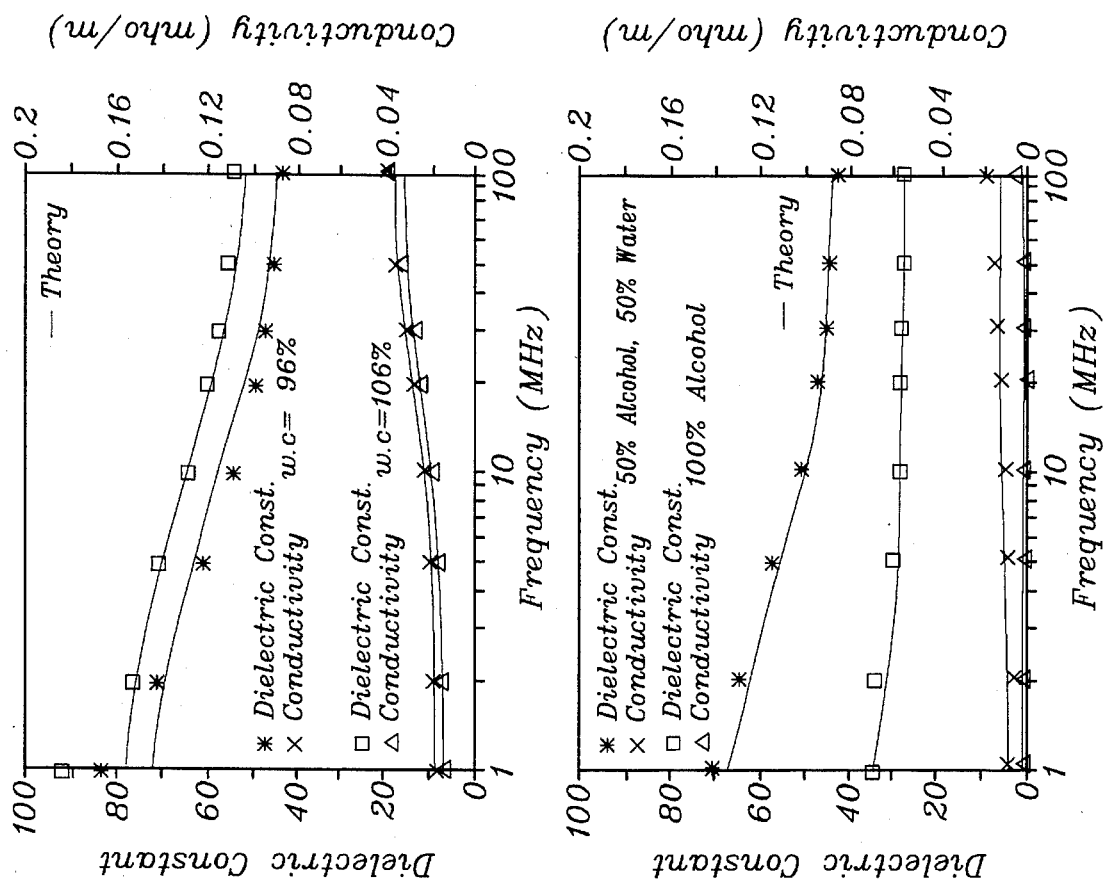
FIGS. 9 (a) and (b) are charts of dielectric constant and conductivity as a function of frequency for a kaolin type soil showing 100% water in FIG. 9(a) and a combination of water and alcohol in the case of FIG. 9 (b).

In FIG. 9 is shown measurements taken for kaolin soil provided, in the case of FIG. 9(a) with 100% tap water, and in the case of FIG. 9(b) with a combination of water and alcohol.

Figure 10:
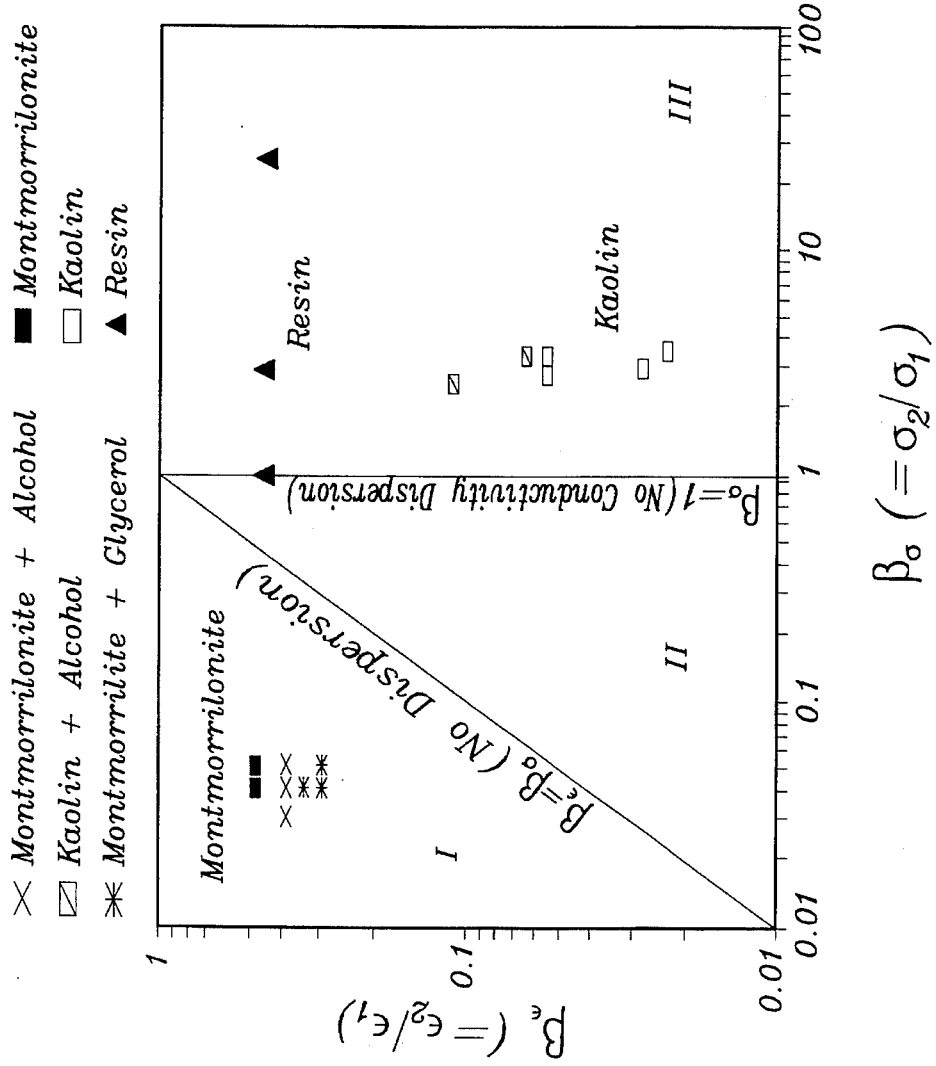
FIG. 10 is a chart of the ratio of solid-to-fluid phase dielectric constant to solid-to-fluid phase conductivity, this forming the basis of a classification by dispersion of different types of soils.

In FIG. 10 is shown a method of classification of soils according to their electric dispersion characteristics. Therein the ratio $\beta\epsilon$ of solid-phase dielectric to fluid-phase dielectric is plotted relative to the ratio $\beta\sigma$ of solid-phase conductivity to fluid-phase conductivity. Based upon these two relationships, all types of known soil appear at very different regions of the chart and, as may be noted, these fall naturally into a case I, case II or case III. That is, the frequency domain electric dispersion of two-phase soil can be placed into three cases. If $\beta\sigma<1$ (cases I and 11), highest dispersion is observed for platy particles whereas the dispersion for spherical-like to long grained particles is negligible. For $\beta\sigma<\beta\epsilon<1$ (case I) the dispersion frequency is in the range of about 10 to 100 MHz. No dispersion is observed for $\beta\sigma=\beta\epsilon$. For $\beta\epsilon<\beta\sigma<1$ (case II) the dispersion is in the range of 10 to 100 MHz. For $\beta\sigma>1$ (case III) the highest dispersion occurs for spherical-like particles compared to platy or long grained particles.

Multiple dispersions are observed for an intermediate range of platy particles. Accordingly, each of the above cases is reflective of a distinct soil-fluid interaction by which soil type as well as fluid phase chemical properties can be predicted.

Figure 11:
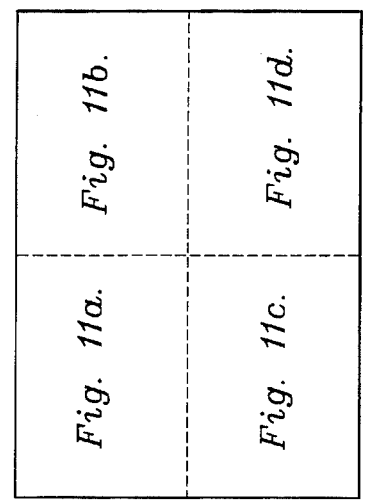

With reference to FIG. 11, there is shown a table in which, for various soil types, a comparison has been made between predicted basic soil parameters derived in accordance with the above described inventive method versus actual measurements of the same soil parameters. Accordingly, as may be appreciated, a high degree of correlation exists between predicted and measured basic soil parameters in accordance with the present invention.

With reference to FIG. 12, several data points of porosity versus equivalent $\epsilon\gamma$ at 55 degrees at a high frequency close to 100 MHz is compared with the theoretical curve relating to the above two for various water saturated soils.

Accordingly, as may be appreciated, a high degree of correlation exists between the theoretical line and actual measured $\epsilon_{55}$ and porosity in accordance with the present invention.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the claims appended herewith.

Having thus described my invention what I claim as new, useful and non-obvious and, accordingly, secure by Letters Patent of the United States is:

1. A method of interpretation of electrical dispersion data relating to porous media, the media having a solid phase and a fluid phase, the method comprising the steps of:
   (a) obtaining with an electromagnetic probe, and as a function of megahertz frequencies, a plurality of bulk media measurements of the parameters of conductivity $\sigma$ and dielectric constant $\epsilon$ at a given azimuth angle $\gamma$ relative to the gravity vector;
   (b) inputting said $\sigma$ and $\epsilon$ measurements into a plurality of dispersion function equations F of the form:

$$F_{\epsilon\gamma} = \frac{\epsilon_1 - \epsilon_2}{\epsilon_\gamma - \epsilon_2} \qquad F_{\sigma\gamma} = \frac{\sigma_1 - \sigma_2}{\sigma_\gamma - \sigma_2}$$

in which $F_{\epsilon\gamma}$ is the dispersion function for dielectric constants at the angle $\gamma$ relative to an axis of symmetry of the porous media;

$F_{\sigma\gamma}$ is the dispersion function for conductivity at the angle $\gamma$ of inclination;

Subscript 1 relates to the dielectric constant and conductivity of the fluid phase or the bulk soil;

Subscripts 2 relates to the dielectric and conductivity of the solid phase of the bulk soil; and Subscript $\gamma$ relates to the dielectric constant and conductivity of the bulk soil at the azimuth angle of the probe; and (c) solving the above dispersion functions F with different frequency values of $\epsilon$ and $\sigma$ to obtain particle shape, size, particle orientation, porosity, conductivity and dielectric constant of respective solid and fluid phases and their interfaces of the measured porous media.

2. The method as recited in claim 1 in which said azimuth angle of said probe comprises about 55 degrees.

3. The method as recited in claim 1 further comprising the Steps of:

comparing the predicted $\epsilon$ and $\sigma$ and comparing the values of the aspect ratio R with anticipated ranges for various soil types; and predicting the primary soil type, based on said comparing Step.

4. The method as recited in claim 1, further comprising the Steps of:

comparing the predicted conductivity, $\sigma_1$ and dielectric constant, $\epsilon_1$, of the fluid phase with anticipated ranges for various fluid types, predicting the primary fluid type based said comparing Step.

5. The method as recited in claim 4, further comprising the Step of:

from said dispersion data, characterizing the chemical properties of said fluid.

\* \* \* \* \*